US008510273B2

(12) United States Patent
Richards et al.

(10) Patent No.: US 8,510,273 B2
(45) Date of Patent: Aug. 13, 2013

(54) SYSTEM, METHOD, AND COMPUTER-READABLE MEDIUM TO FACILITATE APPLICATION OF ARRIVAL RATE QUALIFICATIONS TO MISSED THROUGHPUT SERVER LEVEL GOALS

(75) Inventors: Anita Richards, San Juan Capistrano, CA (US); Douglas Brown, Rancho Santa Fe, CA (US)

(73) Assignee: Teradata US, Inc., Dayton, OH (US)

( * ) Notice: Subject to any disclaimer, the term of this patent is extended or adjusted under 35 U.S.C. 154(b) by 317 days.

(21) Appl. No.: 12/552,311

(22) Filed: Sep. 2, 2009

(65) Prior Publication Data
US 2011/0055168 A1    Mar. 3, 2011

(51) Int. Cl.
G06F 17/30    (2006.01)

(52) U.S. Cl.
USPC .......................................... 707/688; 707/713

(58) Field of Classification Search
USPC ................................................. 707/688, 713
See application file for complete search history.

(56) References Cited

U.S. PATENT DOCUMENTS

| | | | | |
|---|---|---|---|---|
| 5,881,238 | A * | 3/1999 | Aman et al. | 709/226 |
| 6,351,747 | B1 * | 2/2002 | Urazov et al. | 1/1 |
| 6,804,714 | B1 * | 10/2004 | Tummalapalli | 709/224 |
| 7,395,537 | B1 * | 7/2008 | Brown et al. | 718/104 |
| 7,996,842 | B2 * | 8/2011 | Savit | 718/104 |
| 2005/0234890 | A1 * | 10/2005 | Enzler et al. | 707/3 |
| 2006/0190430 | A1 * | 8/2006 | Luo et al. | 707/3 |
| 2007/0130231 | A1 * | 6/2007 | Brown et al. | 707/204 |
| 2007/0174346 | A1 * | 7/2007 | Brown et al. | 707/200 |
| 2007/0234365 | A1 * | 10/2007 | Savit | 718/104 |
| 2007/0271570 | A1 * | 11/2007 | Brown et al. | 718/105 |
| 2008/0077932 | A1 * | 3/2008 | Ruppach et al. | 718/105 |
| 2008/0162417 | A1 * | 7/2008 | Morris et al. | 707/2 |
| 2008/0162418 | A1 * | 7/2008 | Morris et al. | 707/2 |
| 2008/0162419 | A1 * | 7/2008 | Brown et al. | 707/2 |
| 2008/0162583 | A1 * | 7/2008 | Brown et al. | 707/200 |
| 2008/0172419 | A1 * | 7/2008 | Richards et al. | 707/200 |
| 2009/0049024 | A1 * | 2/2009 | Brown et al. | 707/4 |
| 2009/0132471 | A1 * | 5/2009 | Brown et al. | 707/2 |

OTHER PUBLICATIONS

Bouganim, Luc, et al., "Dynamic Query Scheduling in Data Integration Systems", ICDE 2000, San Diego, CA, Feb. 29-Mar. 3, 2000, pp. 425-434.*

(Continued)

Primary Examiner — Baoquoc N To
(74) Attorney, Agent, or Firm — Steve McDonald; Michael Chan

(57) ABSTRACT

A system, method, and computer-readable medium that provide mechanisms for tracking the number of queries received for processing for a workload to facilitate arrival rate qualifications to Throughput Service Level Goals are provided. A number of queries counter associated with a particular workload is incremented each time a query assigned to the particular workload is received thereby tracking the arrival rate of workload queries. When a system performance condition comprising a non-compliant system performance level with respect to a Throughput Service Level Goal is identified, the number of queries counter is compared with the Throughput Service Level Goal. If the arrival rate of queries for the workload is greater than the Throughput Service Level Goal of the workload, actions associated with non-compliance of the Throughput Service Level Goal may then be performed. If the number of queries counter is less than or equal to the Throughput Service Level Goal, the preliminary identification of the missed Service Level Goal as a system performance condition event is dismissed or otherwise ignored.

12 Claims, 10 Drawing Sheets

(56) References Cited

OTHER PUBLICATIONS

Krompass, S., et al., "Quality of Service Enabled Database Applications", ICSOC 2006, LNCS 4294, Springer-Verlag, Berlin, Germany, © 2006, pp. 215-226.*

Qu, Huiming, et al., "UNIT: User-centric Transaction Management in Web-Database Systems", ICDE '06, Atlanta, GA, IEEE Computer Society, Apr. 3-7, 2006, pp. 1-10.*

Lee, Mong Li, et al., "Towards Self-Tuning Data Placement in Parallel Database Systems", SIGMOD 2000, Dallas, TX, © 1999, pp. 225-236.*

Bouganim, Luc, et al., "Dynamic Load Balancing in Hierarchical Parallel Database Systems", Groupement d'Intérêt Economique Dyade (joint R&D venture between Bull and Inria), ISSN 0249-6399, Research Report No. 2815, Mar. 1996, 22 pages.*

Brown, Douglas P., et al., "Teradata Active Management—High Level Architectural Overview", EB-4685-0907, © 2007 Teradata Corp., 12 pages.*

* cited by examiner

Administrator

Regulator

Workload Query
(Delay) Manager

SYSTEM, METHOD, AND COMPUTER-READABLE MEDIUM TO FACILITATE APPLICATION OF ARRIVAL RATE QUALIFICATIONS TO MISSED THROUGHPUT SERVER LEVEL GOALS

BACKGROUND

Modern computing systems execute a variety of requests concurrently and operate in a dynamic environment of cooperative systems, each comprised of numerous hardware components subject to failure or degradation. The need to regulate concurrent hardware and software 'events' has led to the development of a field which may be generically termed 'Workload Management.'

Workload management techniques focus on managing or regulating a multitude of individual yet concurrent requests in a computing system by effectively controlling resource usage within the computing system. Resources may include any component of the computing system, such as central processing unit (CPU) usage, hard disk or other storage device usage, input/output (I/O) usage, and the like.

Workload management techniques fall short of implementing a full system regulation, as they do not manage unforeseen impacts, such as unplanned situations (e.g., a request volume surge, the exhaustion of shared resources, or external conditions such as component outages), or even planned situations (e.g., system maintenance or data load).

Many different types of system conditions or events may negatively impact the performance of requests currently executing on a computer system. These events may remain undetected for a prolonged period of time, causing a compounding negative effect on requests executing during that interval. When problematic events are detected, sometimes in an ad hoc and manual fashion, the computing system administrator may still not be able to take an appropriate course of action, and may either delay corrective action, act incorrectly, or not act at all.

Contemporary workload management systems allow users to establish Service Level Goals (SLGs) for workloads (WDs). The SLGs are primarily used for reporting purposes, e.g., to gauge the success of the workload's performance and to note trends with respect to meeting those SLGs. One of the options is to establish an SLG based on response time with a service percentage. A second option is to define the SLG based on throughput rate (i.e., completions).

A second use of the SLGs is to automatically detect when SLGs are being missed. For example, one of the primary approaches used by database administrators (DBAs) and System Administrators is to first identify that there is a problem with their SLGs. Investigations into why will typically start with analysis at the system-level. If the system is not 100% busy and does not have heavy skewing, then typically the DBA will next check for blocked sessions.

However if the CPU is 100% busy, then the number of active sessions will be checked for unusually high concurrency levels. If some workloads have too many active sessions, then appropriate actions may be taken, such as to limit concurrency, to abort queries, and/or to make adjustments to the Priority Scheduler weights.

If the CPU is 100% busy and active sessions appear appropriate, the DBA may next check the CPU usage by WD and/or session to evaluate if there is a runaway query. From here, the DBA may take the appropriate action, e.g., to abort the offending request.

Notably, these investigations are triggered based on knowing that SLGs are being missed, enabling the DBA to act manually or automatically to resolve the situation, and bring WD performance back to SLG conformance.

A real-time event to detect when SLGs are being missed in order to either notify a DBA or application to take action, or to act automatically within the regulator, is straightforward when considering a response time oriented SLG. However, when the SLG is based on a throughput metric, detections may prove unnecessary when the reason for the missed Throughput-SLG is under-demand rather than the system's inability to provide service to achieve the target throughput level.

Therefore, what is needed is a mechanism that overcomes the described problems and limitations.

SUMMARY

In general, in one aspect, disclosed embodiments provide mechanisms for tracking the number of queries received for processing for a workload to facilitate arrival rate qualifications to throughput service level goals. A number of queries counter associated with a particular workload is incremented each time a query assigned to the particular workload is received thereby tracking the arrival rate of workload queries. To facilitate arrival rate qualifications to throughput service level goals, a moved-in and moved-out metric or parameter may be associated with respective workloads. In the event that a query is moved from one workload to another workload after the query has be accounted for in the number of queries counter associated with the workload, a moved-out metric associated with the workload may be incremented to indicate that a query has been removed from the workload. In this manner, the number of queries counter associated with the workload to which the query was originally assigned may be adjusted accordingly. In a similar manner, a moved-in metric associated with the workload may be incremented when a query that has previously been received and assigned to another workload is moved into the workload. The number of queries counter may be adjusted to properly reflect the received number or queries allocated to a workload by subtracting the moved-out metric of the workload and adding the moved-in metric of the workload. When a system performance condition comprising a non-compliant system performance level with respect to a Throughput Service Level Goal is identified, the arrival rate, as specified by the number of queries counter, may be compared with the Throughput Service Level Goal. If the arrival rate of queries for the workload is greater than the Throughput Service Level Goal of the workload, then the cause of the missed Service Level Goal is system over-load, and actions associated with non-compliance of the Throughput Service Level Goal may then be performed. However, if the query arrival rate as specified by the number of queries counter of the workload is less than or equal to the Throughput Service Level Goal of the workload, then the cause of the missed Throughput Service Level Goal is under-demand, and the preliminary identification of the missed Service Level Goal as a system performance condition event is dismissed or otherwise ignored. That is, the missed Service Level Goal is not treated as a system performance condition event, and the action(s) associated with non-compliance of the Throughput Service Level Goal are not performed.

In an embodiment, a method of evaluating service level goals in a database system is provided. The method includes associating one or more actions with a throughput service level goal that may be performed by the database system responsive to determining the throughput service level goal has not be met by the database system, identifying the arrival of an event in the database system, reading the throughput service level goal assigned to a workload comprising a plurality of queries, wherein the throughput service level goal specifies a target number of queries of the workload to be processed per a predefined unit of time, reading a number of queries that have been received for the workload during the unit of time, and determining whether the number of queries that have been received exceeds the target number of queries specified by the throughput service level goal.

In another embodiment, a computer-readable medium having computer-executable instructions for execution by a processing system, the computer-executable instructions for evaluating service level goals in a database system, is provided. The computer-executable instructions, when executed, cause the processing system to associate one or more actions with the throughput service level goal that may be performed responsive to determining the throughput service level goal has not be met by the database system, identify the arrival of an event in the database system, read a throughput service level goal assigned to a workload comprising a plurality of queries, wherein the throughput service level goal specifies a target number of queries of the workload to be processed per a predefined unit of time, read a number of queries that have been received for the workload during the unit of time, and determine whether the number of queries that have been received exceeds the target number of queries specified by the throughput service level goal.

In another embodiment, a database system for evaluating service level goals in the database system is provided. The system includes at least one storage facility on which a database table is stored, and a plurality of processing modules each allocated a respective subset of rows of the table. A processing module of the plurality of processing modules associates one or more actions with a throughput service level goal that may be performed by the processing module responsive to determining the throughput service level goal has not be met, identifies the arrival of an event in the database system, reads the throughput service level goal assigned to a workload comprising a plurality of queries, wherein the throughput service level goal specifies a target number of queries of the workload to be processed per a predefined unit of time, reads a number of queries that have been received for the workload during the unit of time, determines the number of queries that have been received does not exceed the target number of queries specified by the throughput service level goal, and ignores the one or more actions.

Other features and advantages will become apparent from the description and claims that follow.

DETAILED DESCRIPTION

Figure 1:
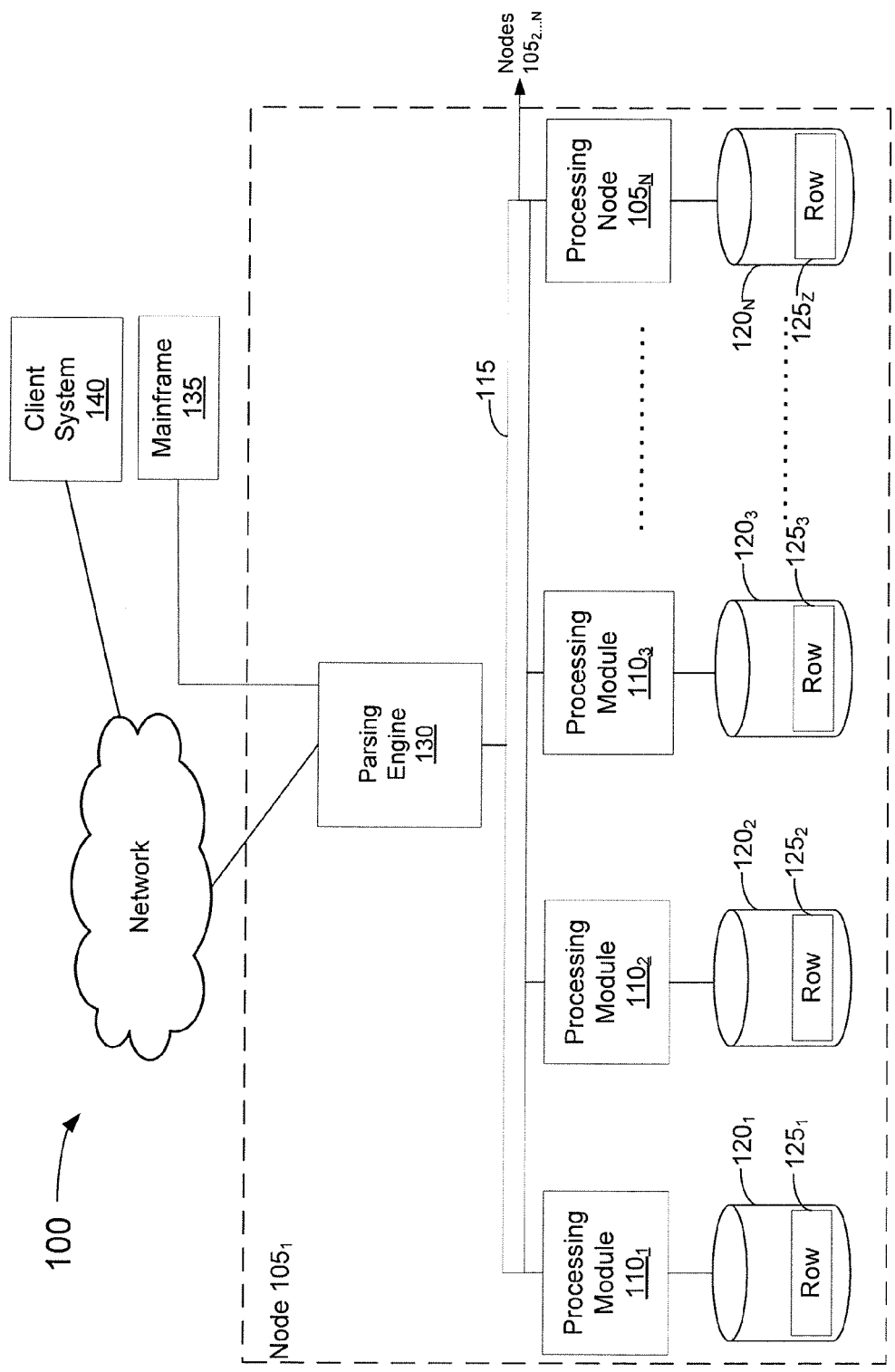
FIG. 1 is a block diagram of a node of a database system.

The event management techniques disclosed herein have particular application to large databases that may contain many millions or billions of records managed by a database system ("DBS") 100, such as a Teradata Active Data Warehousing System available from Teradata Corporation. FIG. 1 shows a sample architecture for one node $105_1$ of the DBS 100. The DBS node $105_1$ includes one or more processing modules $110_1 \ldots _N$, connected by a network 115 that manage the storage and retrieval of data in data storage facilities $120_1 \ldots _N$. Each of the processing modules $110_1 \ldots _N$ may be one or more physical processors or each may be a virtual processor, with one or more virtual processors running on one or more physical processors.

For the case in which one or more virtual processors are running on a single physical processor, the single physical processor swaps between the set of N virtual processors. Each virtual processor is generally termed an Access Module Processor (AMP) in the Teradata Active Data Warehousing System.

For the case in which N virtual processors are running on a processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_1 \ldots _N$ manages a portion of a database that is stored in a corresponding one of the data storage facilities $120_1 \ldots _N$. Each of the data storage facilities $120_1 \ldots _N$ includes one or more disk drives. The DBS may include multiple nodes $105_2 \ldots _N$ in addition to the illustrated node $105_1$, connected by extending the network 115.

The system stores data in one or more tables in the data storage facilities $120_1 \ldots _N$. The rows $125_1 \ldots _Z$ of the tables are stored across multiple data storage facilities $120_1 \ldots _N$ to ensure that the system workload is distributed evenly across the processing modules $110_1 \ldots _N$. A parsing engine 130 organizes the storage of data and the distribution of table rows $125_1 \ldots _Z$ among the processing modules $110_1 \ldots _N$. The parsing engine 130 also coordinates the retrieval of data from the data storage facilities $120_1 \ldots _N$ in response to queries received from a user at a mainframe 135 or a client computer 140. The DBS 100 usually receives queries in a standard format, such as SQL.

Figure 2:
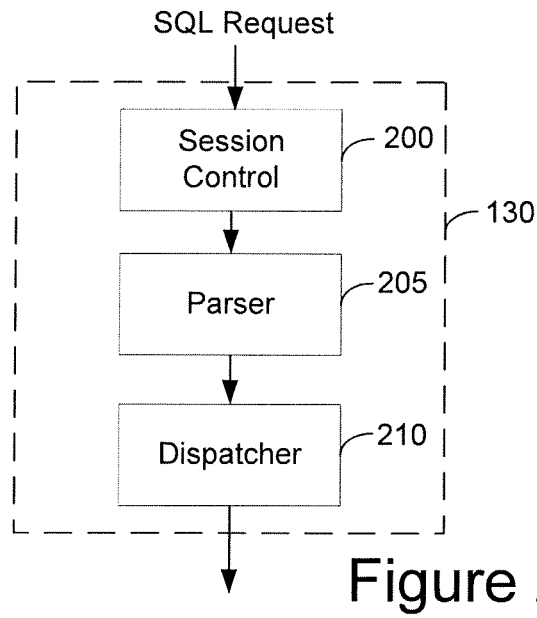
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
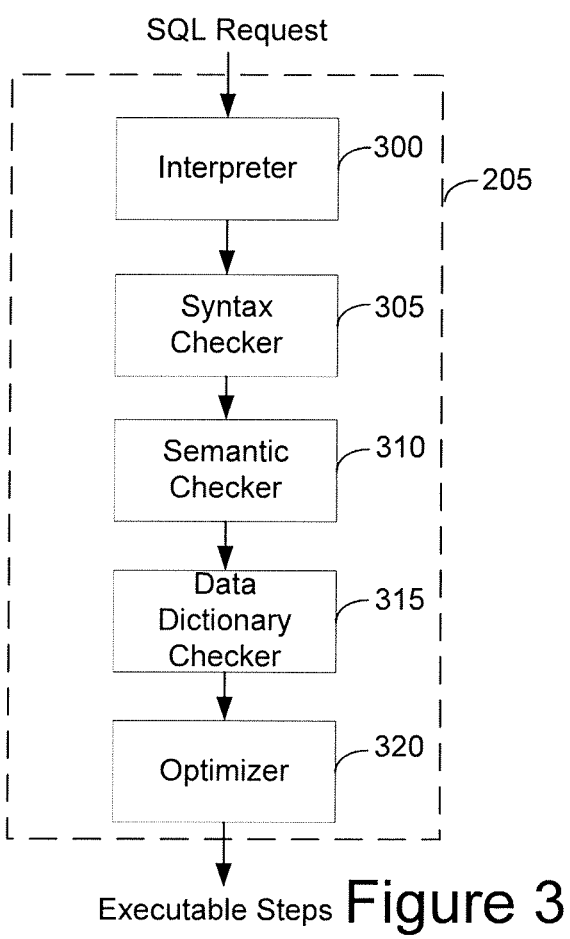
FIG. 3 is a flow chart of a parser.

Once the session control 200 allows a session to begin, a user may submit a SQL request that is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320) that develops the least expensive plan to perform the request.

The DBS described herein accepts performance goals for each workload as inputs, and dynamically adjusts its own performance, such as by allocating DBS resources and throttling back incoming work. In one example system, the performance parameters are called priority scheduler parameters. When the priority scheduler is adjusted, weights assigned to resource partitions and allocation groups are changed. Adjusting how these weights are assigned modifies the way access to the CPU, disk and memory is allocated among requests. Given performance objectives for each workload and the fact that the workloads may interfere with each other's performance through competition for shared resources, the DBS may find a performance setting that achieves one workload's goal but makes it difficult to achieve another workload's goal.

The performance goals for each workload will vary widely as well, and may or may not be related to their resource demands. For example, two workloads that execute the same application and DBS code may have differing performance goals simply because they were submitted from different departments in an organization. Conversely, even though two workloads have similar performance objectives, they may have very different resource demands.

The system includes a "closed-loop" workload management architecture capable of satisfying a set of workload-specific goals. In other words, the system is a goal-oriented workload management system capable of supporting complex workloads and capable of self-adjusting to various types of workloads. The workload management system is referred to as an Active System Management (ASM).

The system's operation has four major phases: 1) assigning a set of incoming request characteristics to workload groups, assigning the workload groups to priority classes, and assigning goals (called Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance. The performance improvement may be accomplished in several ways: 1) through performance tuning recommendations such as the creation or change in index definitions or other supplements to table data, or to recollect statistics, or other performance tuning actions, 2) through capacity planning recommendations, for example increasing system power, 3) through utilization of results to enable optimizer self-learning, and 4) through recommending adjustments to SLGs of one workload to better complement the SLGs of another workload that it may be impacting. All recommendations can either be enacted automatically, or after "consultation" with the database administrator (DBA).

Figure 4:
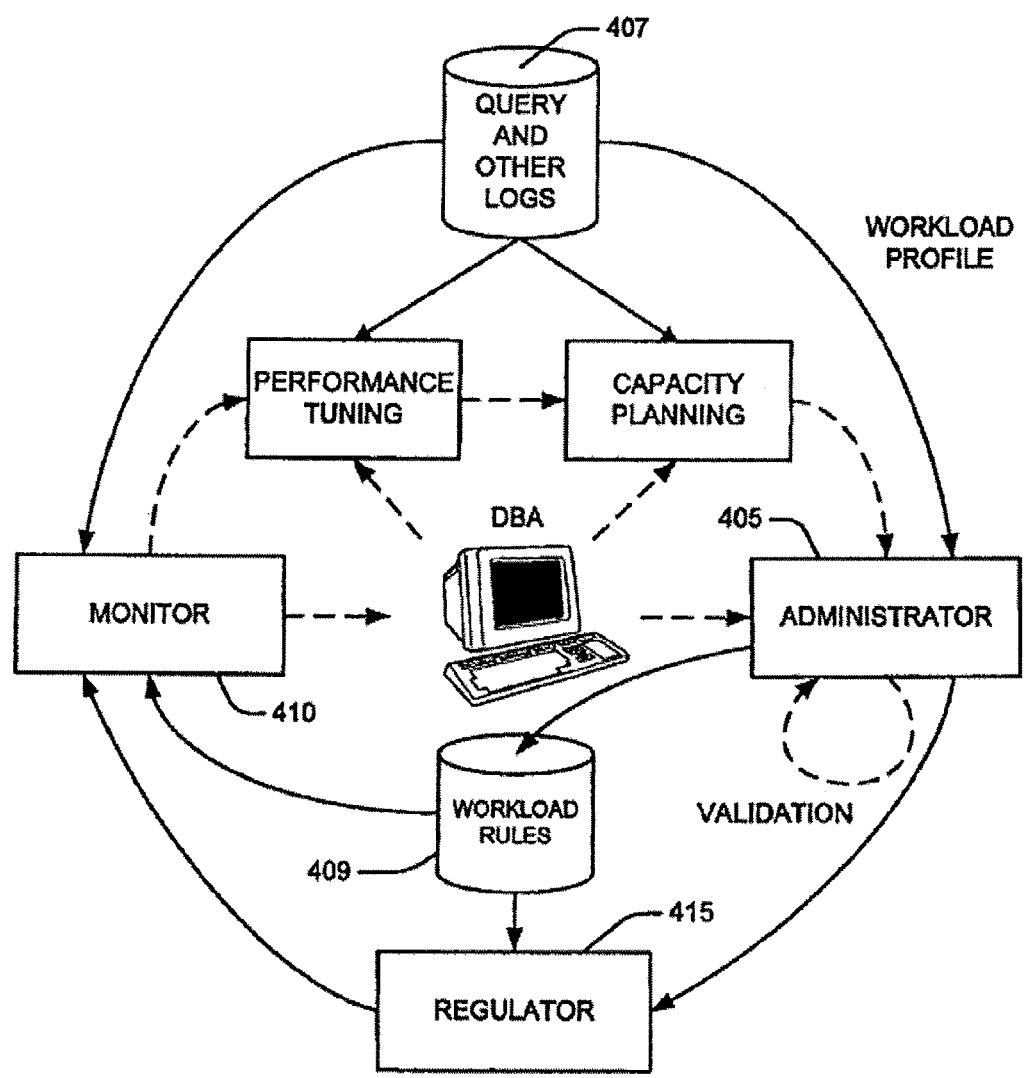
FIGS. 4-7 are block diagrams of a system for administering the workload of a database system.

An exemplary system is illustrated in FIG. 4. The system includes an Administrator 405. This component provides a GUI to define workloads and their SLGs and other workload management requirements. The administrator 405 accesses data in logs 407 associated with the system, including a query log, and receives capacity planning and performance tuning inputs as discussed above. The administrator 405 is a primary interface for the DBA. The administrator also establishes workload rules 409, which are accessed and used by other elements of the system. The system further includes a monitor 410. The monitor 410 provides a top level dashboard view, and the ability to drill down to various details of workload group performance, such as aggregate execution time, execution time by request, aggregate resource consumption, resource consumption by request, etc. Such data is stored in the query log and other logs 407 available to the monitor. The monitor 410 also includes processes that initiate the performance improvement mechanisms listed above and processes that provide long term trend reporting, which may include providing performance improvement recommendations. Some of the monitor functionality may be performed by the regulator 415. The regulator 415 dynamically adjusts system settings and/or projects performance issues and either alerts the DBA or user to take action, for example, by communication through the monitor, which is capable of providing alerts, or through the exception log, providing a way for applications and their users to become aware of, and take action on, regulator actions. Alternatively, the regulator 415 may automatically take action by deferring requests or executing requests with the appropriate priority to yield the best solution given requirements defined by the administrator 405.

The workload management administrator 405, or "administrator," is responsible for determining (e.g., recommending) the appropriate application settings based on SLGs. Such activities include setting weights, managing active work tasks, and changes to any and all options may be automatic and taken out of the hands of the DBA. The user may be masked from all complexity involved in setting up the priority scheduler, and be freed to address the business issues around it.

Figure 5:
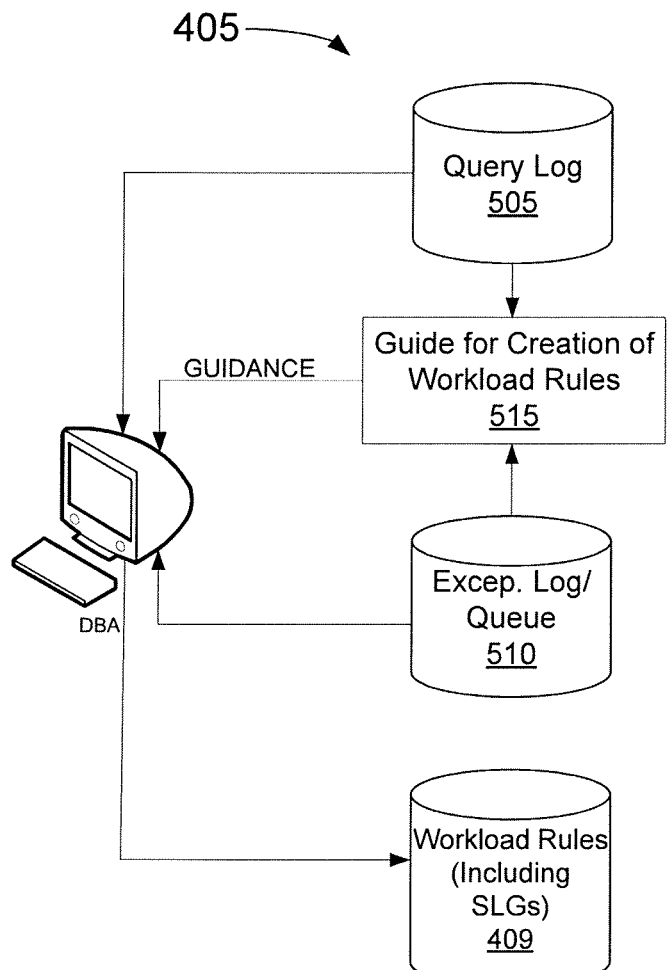

As shown in FIG. 5, the workload management administrator 405 allows the DBA to establish workload rules, including SLGs, which are stored in a storage facility 409, accessible to the other components of the system. The DBA has access to a query log 505, which stores the steps performed by the DBS in executing a request along with database statistics associated with the various steps, and an exception log/queue 510, which contains records of the system's deviations from the SLGs established by the administrator. With these resources, the DBA can examine past performance and establish SLGs that are reasonable in light of the available system resources. In addition, the system provides a guide for the creation of workload rules 515 which guides the DBA in establishing the workload rules 409. The guide accesses the query log 505 and the exception log/queue 510 in providing its guidance to the DBA.

The administrator assists the DBA in: a) Establishing rules for dividing requests into candidate workload groups, and creating workload group definitions. Requests with similar characteristics (e.g., users, application, table, resource requirement, etc.) may be assigned to the same workload group. The system supports the possibility of having more than one workload group with similar system response requirements. b) Refining the workload group definitions and defining SLGs for each workload group. The system provides guidance to the DBA for response time and/or arrival rate threshold setting by summarizing response time and arrival rate history per workload group definition versus resource utilization levels, which it extracts from the query log 505 (from data stored by the regulator, as described below), allowing the DBA to know the current response time and arrival rate patterns. The DBA may then cross-compare those patterns to satisfaction levels or business requirements, if known, to derive an appropriate response time and arrival rate threshold setting, e.g., an appropriate SLG. After the administrator specifies the SLGs, the system automatically generates the appropriate resource allocation settings, as described below. These SLG requirements are distributed to the rest of the system as workload rules. c) Optionally, establishing priority classes and assigning workload groups to the classes. Workload groups with similar performance requirements are assigned to the same class. d) Providing proactive feedback (e.g., validation) to the DBA regarding the workload groups and their SLG assignments prior to execution to better assure that the current assignments can be met, e.g., that the SLG assignments as defined and potentially modified by the DBA represent realistic goals. The DBA has the option to refine workload group definitions and SLG assignments as a result of that feedback.

Figure 6:
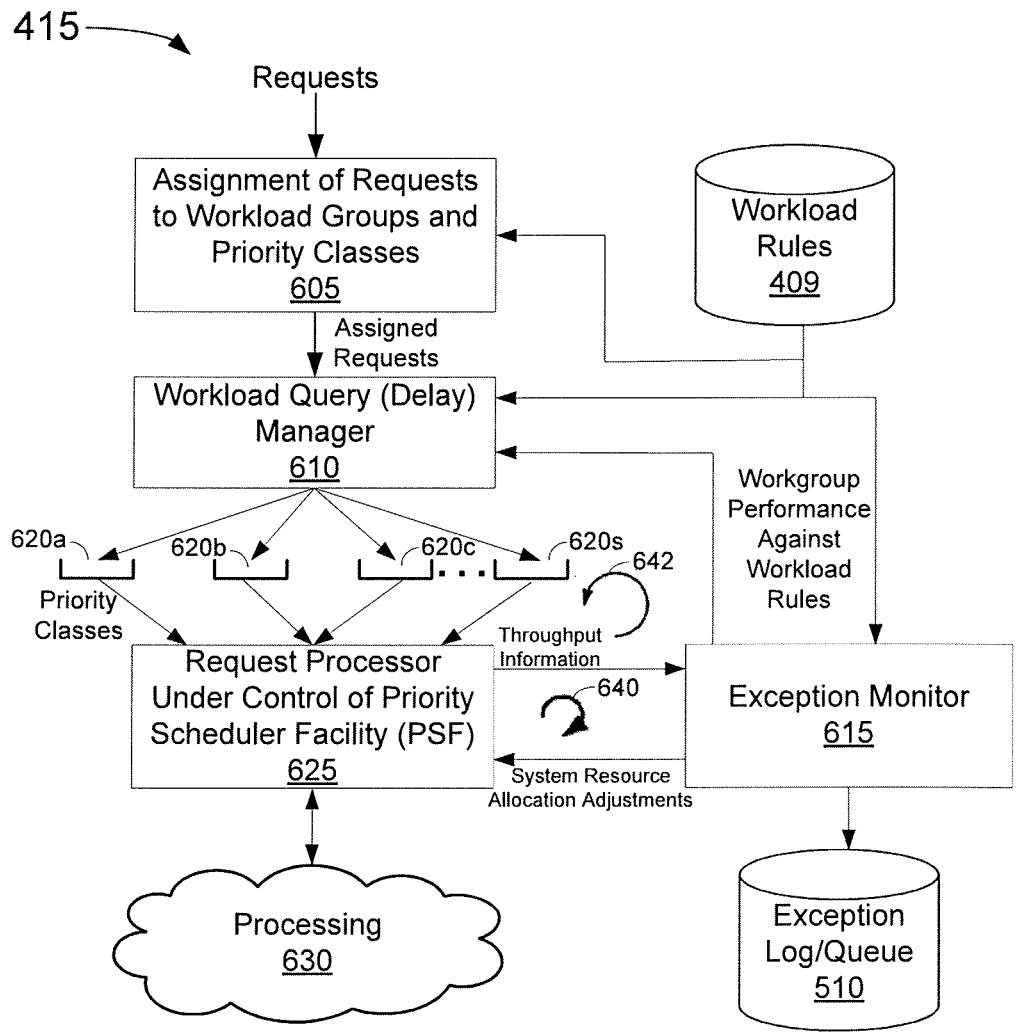

The internal monitoring and regulating component (regulator 415), illustrated in more detail in FIG. 6, accomplishes its objective by dynamically monitoring the workload characteristics (defined by the administrator) using workload rules or other heuristics based on past and current performance of the system that guide two feedback mechanisms. It does this before the request begins execution and at periodic intervals during query execution. Prior to query execution, an incoming request is examined to determine in which workload group it belongs, based on criteria described below with respect to FIG. 11. In an embodiment, the number of queries received for processing for each workload is tracked to facilitate arrival rate qualifications to throughput service level goals. A number of queries counter associated with a particular workload is incremented each time a query assigned to the particular workload is received thereby tracking the arrival rate of workload queries. The number of queries counter may be periodically reset, e.g., upon an event detection or the expiration of an event interval. Concurrency levels, i.e., the number of concurrent executing queries from each respective workload group, are monitored, and if current workload group concurrency levels are above an administrator-defined threshold, a request in that workload group waits in a queue prior to execution until the concurrency level subsides below the defined threshold. Query execution requests currently being executed are monitored to determine if they still meet the criteria of belonging in a particular workload group by comparing request execution characteristics to a set of exception conditions. If the result suggests that a request violates the rules associated with a workload group, an action is taken to move the request to another workload group or to abort it, and/or alert or log the situation with potential follow-up actions as a result of detecting the situation. Current response times and throughput of each workload group are also monitored dynamically to determine if they are meeting SLGs. To facilitate arrival rate qualifications to throughput service level goals, a moved-in and moved-out metric or parameter may be associated with respective WDs. In the event that a query is moved from one workload to another workload after the query has be accounted for in the number of queries counter associated with the workload, a moved-out metric associated with the WD may be incremented to indicate that a query has been removed from the workload. In this manner, the number of queries counter associated with the workload to which the query was originally assigned may be adjusted accordingly. In a similar manner, a moved-in metric associated with the WD may be incremented when a query that has previously been received and assigned to another WD is moved into the WD. The number of queries counter may be adjusted to properly reflect the received number or queries allocated to a WD by subtracting the moved-out metric of the WD and adding the moved-in metric of the WD. A resource weight allocation for each performance group can be automatically adjusted to better enable meeting SLGs using another set of heuristics described with respect to FIG. 6.

As shown in FIG. 6, the regulator 415 receives one or more requests, each of which is assigned by an assignment process (block 605) to a workload group and, optionally, a priority class, in accordance with the workload rules 409. The assigned requests are passed to a workload query (delay) manager 610, which is described in more detail with respect to FIG. 7. In general, the workload query (delay) manager 610 monitors the workload performance compared to the workload rules and either allows the request to be executed immediately or holds it for later execution, as described below. If the request is to be executed immediately, the workload query (delay) manager 610 places the request in the priority class bucket 620a . . . s corresponding to the priority class to which the request was assigned by the administrator 405. A request processor 625 under control of a priority scheduler facility (PSF) selects queries from the priority class buckets 620a . . . s in an order determined by the priority associated with each of the buckets, and executes it, as represented by the processing block 630 of FIG. 6.

The request processor 625 also monitors the request processing and reports throughput information, for example, for each request and for each workgroup, to an exception monitoring process 615. The exception monitoring process 615 compares the throughput with the workload rules 409 and stores any exceptions (e.g., throughput deviations from the workload rules) in the exception log/queue. In addition, the exception monitoring process 615 provides system resource allocation adjustments to the request processor 625, which adjusts system resource allocation accordingly, e.g., by adjusting the priority scheduler weights. Further, the exception monitoring process 615 provides data regarding the workgroup performance against workload rules to the workload query (delay) manager 610, which uses the data to determine whether to delay incoming requests, depending on the workload group to which the request is assigned.

As can be seen in FIG. 6, the system provides two feedback loops 640 and 642, indicated by the circular arrows shown in the drawing. The first feedback loop 640 includes the request processor 625 and the exception monitoring process 615. In this first feedback loop 640, the system monitors on a short-term basis the execution of requests to detect deviations greater than a short-term threshold from the defined service level for the workload group to which the requests were defined. If such deviations are detected, the DBS is adjusted, e.g., by adjusting the assignment of system resources to workload groups. The second feedback loop 642 includes the workload query (delay) manager 610, the request processor 625 and the exception monitoring process 615. In this second feedback loop 642, the system monitors on a long-term basis to detect deviations from the expected level of service greater than a long-term threshold. If it does, the system adjusts the execution of requests, e.g., by delaying, swapping out or aborting requests, to better provide the expected level of service. Note that swapping out requests is one form of memory control in the sense that before a request is swapped out, it consumes memory, and after it is swapped out, it does not. While this is the preferable form of memory control, other forms, in which the amount of memory dedicated to an executing request can be adjusted as part of the feedback loop, are also possible.

In accordance with disclosed embodiments, the detection of throughput-based SLG misses undergo an additional qualification based on actual arrival rates. Generally, missed Throughput-SLGs may be caused by system overload or system under-demand. Other types of SLGs, such at response time SLGs that specify processing completion duration goals for queries or workloads, may not require additional qualifications for evaluation of a missed SLG.

If the arrival rate of queries for a particular WD is greater than the Throughput-SLG of the WD, then the cause of the missed SLG is system over-load. Not only is the system falling behind and unable to keep up with arrivals to this workload, other competing workloads may be impacting the ability to at least deliver the Throughput-SLG.

Alternatively, if the arrival rate of a WD is less than or equal to the Throughput-SLG of the WD, then the cause of the missed Throughput-SLG is under-demand. In other words, there is insufficient demand from the application servers to realize the Throughput-SLG. The system could be nearly idle and therefore miss the Throughput-SLG. Thus, by pre-qualifying the missed SLG throughput event with a detection that the query arrivals are greater than the Throughput-SLG, the detection of an uninteresting and inconsequential situation is avoided.

Figure 7:
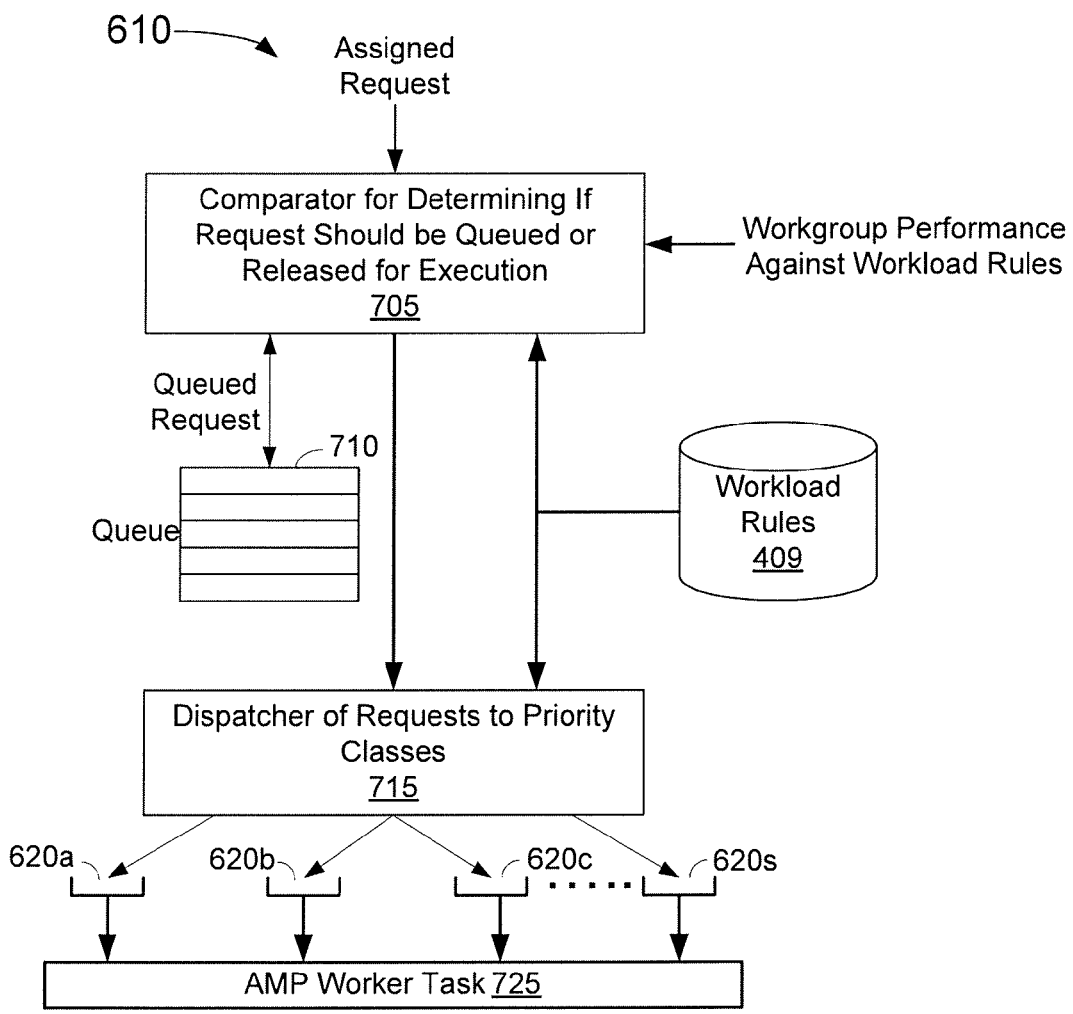

The workload query (delay) manager 610, shown in greater detail in FIG. 7, receives an assigned request as an input. A comparator 705 determines if the request should be queued or released for execution. It does this by determining the workload group assignment for the request and comparing that workload group's performance against the workload rules, provided by the exception monitoring process 615. For example, the comparator 705 may examine the concurrency level of requests being executed under the workload group to which the request is assigned. Further, the comparator may compare the workload group's performance against other workload rules.

If the comparator 705 determines that the request should not be executed, it places the request in a queue 710 along with any other requests for which execution has been delayed. The comparator 705 continues to monitor the workgroup's performance against the workload rules and when it reaches an acceptable level, it extracts the request from the queue 710 and releases the request for execution. In some cases, it is not necessary for the request to be stored in the queue to wait for workgroup performance to reach a particular level, in which case it is released immediately for execution.

Once a request is released for execution it is dispatched (block 715) to priority class buckets 620a . . . s, where it will await retrieval by an AMP Worker Task (AWT) 725.

The exception monitoring process 615, receives throughput information from the AWT 725. The workload performance to workload rules comparator 705 compares the received throughput information to the workload rules and logs any deviations that it finds in the exception log/queue 510. It also generates the workload performance against workload rules information that is provided to the workload query (delay) manager 610.

As stated above, a series of AMP Worker Tasks (AWT) process the requests. An AWT is a thread/task that runs inside of each virtual AMP. An AWT is generally utilized to process requests/queries from users, but may also be triggered or used by internal database software routines, such as deadlock detection.

Pre-allocated AWTs are assigned to each AMP and work on a queue system. That is, each AWT waits for work to arrive, performs the work, and then returns to the queue and waits for more work. Due to their stateless condition, AWTs respond quickly to a variety of database execution needs. At the same time, AWTs serve to limit the number of active processes performing database work within each AMP at any point in time. In other words, AWTs play the role of both expeditor and governor of requests/queries.

AMP worker tasks are one of several resources that support the parallel performance architecture within the database system. AMP worker tasks are of a finite number, with a limited number available to perform new work on the system. This finite number is an orchestrated part of the internal work flow management. Reserving a special set of reserve pools for single and few-AMP queries may be beneficial for active data warehouse applications, but only after establishing a need exists. Understanding and appreciating the role of AMP worker tasks, both in their availability and their scarcity, leads to the need for a more pro-active management of AWTs and their usage.

AMP worker tasks are execution threads that do the work of executing a query step, once the step is dispatched to the AMP. They also pick up the work of spawned processes, and of internal tasks such as error logging or aborts. Not being tied to a particular session or transaction, AMP worker tasks are anonymous and immediately reusable and are able to take advantage of any of the CPUs. Both AMPs and AWTs have equal access to any CPU on the node. A fixed number of AWTs are pre-allocated at startup for each AMP in the configuration, with the default number being, for example, 80. All of the allocated AWTs can be active at the same time, sharing the CPUs and memory on the node.

When a query step is sent to an AMP, that step acquires a worker task from the pool of available AWTs. All of the information and context needed to perform the database work is contained within the query step. Once the step is complete, the AWT is returned to the pool. If all AMP worker tasks are busy at the time the message containing the new step arrives, then the message will wait in a queue until an AWT is free. Position in the queue is based first on work type, and secondarily on priority, which is carried within the message header. Priority is based on the relative weight that is established for the Priority Scheduler allocation group that controls the query step. Too much work can flood the best of databases. Consequently, all database systems have built-in mechanisms to monitor and manage the flow of work in a system. In a parallel database, flow control becomes even more pressing, as balance is only sustained when all parallel units are getting their fair portion of resources.

The disclosed database system is able to operate near the resource limits without exhausting any of them by applying control over the flow of work at the lowest possible level in the system. Each AMP monitors its own utilization of critical resources, AMP worker tasks being one. If no AWTs are available, it places the incoming messages on a queue. If messages waiting in the queue for an AWT reach a threshold value, further message delivery is throttled for that AMP, allowing work already underway to complete. Other AMPs continue to work as usual.

One technique that has proven highly effective in helping the disclosed database system to weather extremely heavy workloads is having a reasonable limit on the number of active tasks on each AMP. The theory behind setting a limit on AWTs is twofold: 1) That it is better for overall throughput to put the brakes on before exhaustion of all resources is reached; and 2) Keeping all AMPs to a reasonable usage level increases parallel efficiency. However this is not a reasonable approach in a dynamic environment.

Ideally, the minimum number of AWTs that can fully utilize the available CPU and I/O are employed. After full use of resources has been attained, adding AWTs will only increase the effort of sharing. As standard queuing theory teaches, when a system has not reached saturation, newly-arriving work may get in, use its portion of the resources, and get out efficiently. However, when resources are saturated, all newly-arriving work experiences delays equal to the time it takes someone else to finish their work. In the disclosed database system, the impact of any delay due to saturation of resources may be aggravated in cases where a query has multiple steps, because there will be multiple places where a delay could be experienced.

In one particular implementation of the disclosed database system, eighty is selected as the maximum number of AWTs to provide the best balance between AWT overhead and contention and CPU and I/O usage. Historically, eighty AWTs has worked well as a number that makes available a reasonable number of AWTs for all the different work types, and yet supports up to 40 or 50 new tasks per AMP comfortably. However, managing AWTs is not always a solution to increased demands on the DBS. In some cases, an increased demand on system resources may have an underlying cause, such that simply increasing the number of available AWTs may only serve to temporarily mask, or even worsen, the demand on resources.

For example, one of the manifestations of resource exhaustion is a lengthening queue for processes waiting for AWTs. Therefore, performance may degrade coincident with a shortage of AWTs. However, this may not be directly attributable to the number of AWTs defined. In this case, adding AWTs will tend to aggravate, not reduce, performance issues.

Using all eighty AWTs in an on-going fashion is a symptom that resource usage is being sustained at a very demanding level. It is one of several signs that the platform may be running out of capacity. Adding AWTs may be treating the effect, but not helping to identify the cause of the performance problem. On the other hand, in some instances, some database systems may reach 100% CPU utilization with significantly less than fifty active processes of the new work type. Some sites experience their peak throughput when forty AWTs are in use servicing new work. By the time many systems are approaching the limit of eighty AWTs, they are already at maximum levels of CPU usage.

In the case where the number of AWTs is reaching their limit, it is likely that a lack of AWTs is merely a symptom of a deeper underlying problem or bottleneck. Therefore, it is necessary to carry out a more thorough investigation of all events in the DBS in an attempt to find the true source of any slowdowns. For example, the underlying or 'real' reason for an increase in CPU usage or an increase in the number of AWTs may be a hardware failure or an arrival rate surge.

Another issue that can impact system-wide performance is a workload event, such as the beginning or conclusion of a load or another maintenance job that can introduce locks or other delays into the DBS or simply trigger the need to change the workload management scheme for the duration of the workload event. The DBS provides a scheduled environment that manages priorities and other workload management controls in operating 'windows' that trigger at certain times of the day, week, and/or month, or upon receipt of a workload event.

Figure 8A:
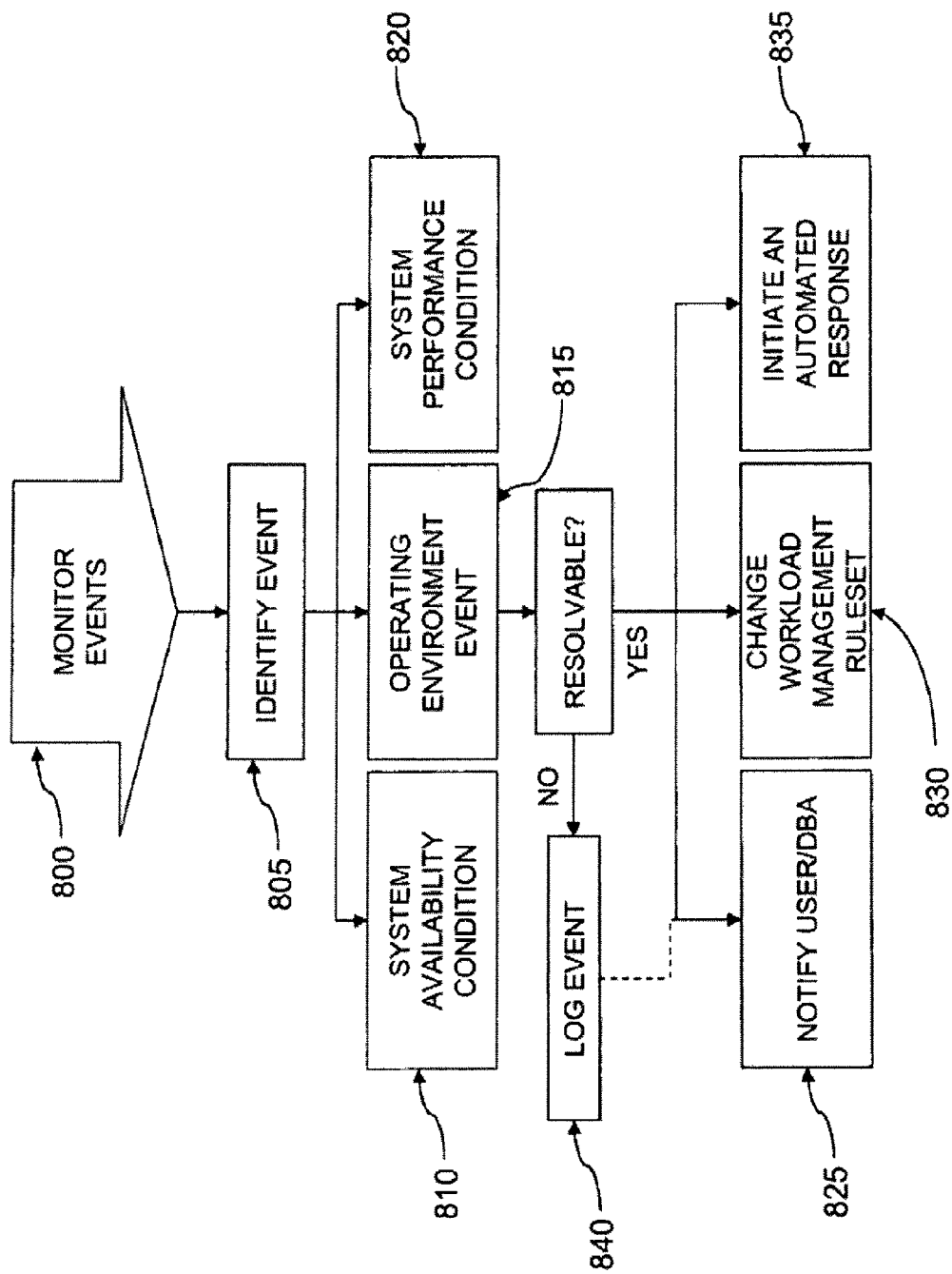
FIG. 8A is a flowchart of an event categorization and management system.

To manage workloads among these dynamic, system-wide situations, it is important to firstly classify the types of various system events that can occur in a DBS, in order to better understand the underlying causes of inadequate performance. As shown in FIG. 8A, a plurality of events are monitored (block 800) and then identified (block 805) so that they can be classified into at least 3 general categories:
1. System Availability Conditions (Hardware conditions) (block 810);
2. Operating Environment (Business Events or other predetermined or scheduled events) (block 815); and
3. System Performance Conditions (block 820).

Firstly, System Availability conditions can include hardware component failure or recovery, or any other event monitored by an ASM monitored queue. This may include a wide range of hardware conditions, from the physical degradation of hardware (e.g., the identification of bad sectors on a hard disk) to the inclusion of new hardware (e.g., hot swapping of CPUs, storage media, addition of I/O or network capabilities, etc.). It may also include events external to the DBS as relayed to the DBS from the enterprise, such as an application server being down, or a dual/redundant system operating in degraded mode.

The second type of detection is an Operating Environment event. Such events can be predetermined or scheduled, in that a user or administrator of the system predefines the event at some point during the operation of the DBS. However, in some instances, operating environment events may occur without any appreciable notice being given to the DBS or to users. The event may be time based, business event based, or based on any other suitable criteria.

Business events can be defined and associated with the beginning and completion of a particular application job. A user-defined event can be sent by the application and received by the DBS. This triggers the regulator of the DBS to operate in the ruleset's working values associated with this event. For example, the working values could direct the DBS to give higher priority to workloads associated with month-end processing, or lower priority associated with workloads doing "regular" work, to enable throttles for non-critical work, and enable filters on workloads that interfere with month-end processing reporting consistency such as might happen when data is being updated while it is being reported on.

In another example, a user may define actions associated with the start of a daily load against a table X. This request triggers a phased set of actions:
1. Upon the "Begin Acquisition Phase" of MultiLoad to table X;
   Promote the priority of all queries that involve table X;
   At the same time, restrict the ability for new queries involving table X from starting until after the data load is completed. This may be performed through delay, scheduling, or disallowing the query upon request;
2. Upon completion of the acquisition phase and the beginning of the "Apply Phase", previously promoted queries that are still running are aborted;
3. Upon completion of data load, lift restrictions on queries involving table X, and allow scheduled and delayed queries to resume.

Another example is to allow the user to define and automate ruleset working value changes based on a user-event (rather than resource or time changes). For example, users may want resource allocation to change based on a business calendar that treats weekends and holidays differently from weekdays, and normal processing differently from quarterly or month-end processing.

As these events are generally driven by business or user considerations, and not necessarily by hardware or software considerations, they are difficult to predict in advance.

The third type of condition is a system performance condition, such as sustained resource usage, resource depletion, resource skew or missed Service Level Goals (SLGs).

An example of a system performance condition is the triggering of an event in response to an ongoing use (or non-use) of a system resource. For example, if there is low sustained CPU and I/O for some qualifying time, then a schedule background task may be allowed to run. This may be achieved by lifting throttle limits, raising priority weights and/or other means. Correspondingly, if the system returns to a high sustained use of the CPU and I/O, then the background task is reduced (e.g., terminated, priority weights lowered, throttle limits lowered, etc.).

Another example of a system performance condition is where a condition is detected due to an increase in the time taken to process a given individual request or workload group. For example, if the average response time is greater than the SLG for a given time interval, then there may be an underlying system performance condition.

In accordance with disclosed embodiments, a system performance condition 820 may be preliminary identified as an event for a missed Throughput-SLG. A Throughput-SLG specifies a target number of queries to be processed during a particular unit of time, and thus may specify a target number of queries to be processed per a pre-defined unit of time. A Throughput-SLG may be assigned on a per-WD basis. In an embodiment, a missed Throughput-SLG may be preliminarily identified as a system performance condition event, but may be subjected to arrival rate qualification evaluations. To this end, a number of queries counter tracks the arrival rate, or number of arrivals, for a WD during a particular period of time. The number of queries counter associated with a particular workload is incremented each time a query assigned to the workload is received. The number of queries counter may be periodically reset, e.g., upon an event detection or the expiration of an event interval. When a system performance condition comprising a non-compliant system performance level with respect to a Throughput-SLG is identified, the arrival rate, as specified by the number of queries counter, may be compared with the Throughput-SLG. If the arrival rate of queries for the WD is greater than the Throughput-SLG of the WD, then the cause of the missed SLG is system over-load, and actions associated with non-compliance of the Throughput-SLG may then be performed. That is, the missed Throughput-SLG is confirmed as a system performance condition event. However, if the query arrival rate as specified by the number of queries counter of the WD is less than or equal to the Throughput-SLG of the WD, then the cause of the missed Throughput-SLG is under-demand, and the preliminary identification of the missed SLG as a system performance condition event is dismissed or otherwise ignored. That is, the missed SLG is not treated as a system performance condition event, and the action(s) associated with non-compliance of the Throughput-SLG are not performed.

A third example may be a sudden increase in the number of AWTs invoked (as described earlier).

In other words, system performance conditions can include the following:

1. Any sustained high or low usage of a resource, such as high CPU usage, high I/O usage, a higher than average arrival rate, or a high concurrency rate;
2. Any unusual resource depletion, such as running out of AWTs, problems with flow control, and unusually high memory usage;
3. Any system skew, such as overuse of a particular CPU in a CPU cluster, or AWT overuse in an AWT cluster; and
4. Missed SLGs.

Upon detection of any of these conditions, whether they are system availability conditions, operating environment events or system performance conditions, one or more actions can be triggered.

Figure 8B:
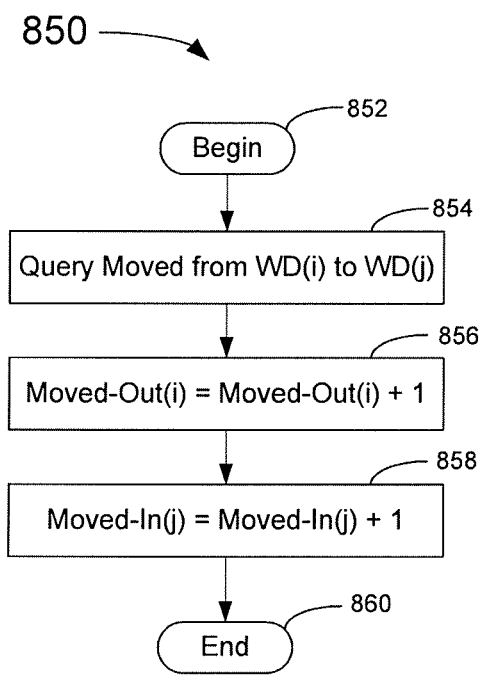
FIG. 8B is a flowchart that depicts processing of a query workload transfer routine that facilitates application of arrival rate qualification tests to service level goals in accordance with disclosed embodiments.

FIG. 8B is a flowchart 850 that depicts processing of a query workload transfer routine that facilitates application of arrival rate qualification tests to service level goals in accordance with disclosed embodiments. The processing steps of FIG. 8B may be implemented as computer-executable instructions tangibly embodied on a computer-readable medium executable by a processing system, such as one or more of the processing modules $110_1$-$110_N$ depicted in FIG. 1.

The query workload transfer routine is invoked (step 852), e.g., upon the transfer of a query from one WD (designated WD(i)) to another WD (designated WD(j)) (step 854). A metric, Moved-Out(i), that tracks the number of queries transferred from the WD(i) to which the query was originally allocated is then incremented (step 856). A respective Moved-Out metric may be associated with each WD and maintains a count of the number of queries that have been transferred from the corresponding WD. A metric, Moved-In(j), that tracks the number of queries transferred to the WD(j) is then incremented (step 858). A respective Moved-In metric may be associated with each WD and maintains a count of the number of queries that have been transferred to the corresponding WD. The query workload transfer routine cycle may then end (step 860).

Figure 8C:
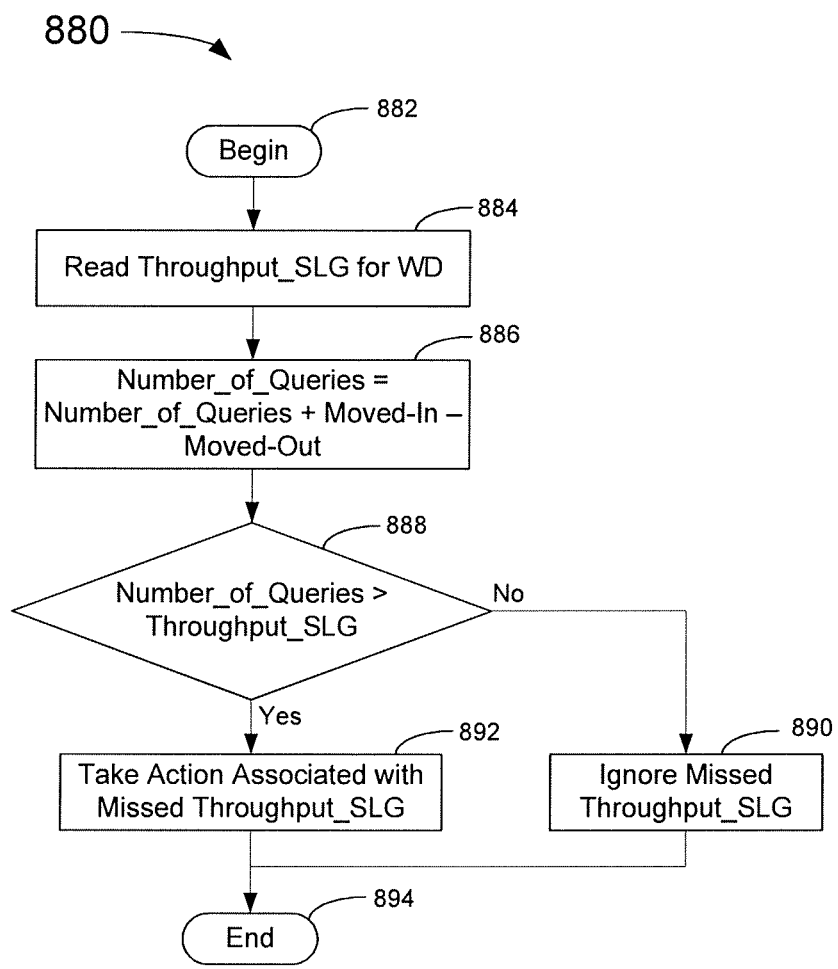
FIG. 8C is a flowchart that depicts processing of a missed throughput service level goal evaluation routine that facilitates application of arrival rate qualification tests in accordance with disclosed embodiments.

FIG. 8C is a flowchart 880 that depicts processing of a missed throughput service level goal evaluation routine that facilitates application of arrival rate qualification tests to service level goals in accordance with disclosed embodiments. The processing steps of FIG. 8C may be implemented as computer-executable instructions tangibly embodied on a computer-readable medium executable by a processing system, such as one or more of the processing modules $110_1$-$110_N$ depicted in FIG. 1.

The service level goal evaluation routine is invoked (step 882), e.g., upon the detection or occurrence of a system performance condition Throughput-SLG event. That is, the service level goal evaluation routine may be invoked upon detection of a missed Throughput-SLG of a particular WD. The service level goal evaluation routine may read the Throughput-SLG assigned to the WD for which the Throughput-SLG event has been detected (step 884). The service level goal evaluation routine may then adjust the Number_of_Queries counter for the WD by subtracting the Moved-Out metric assigned to the WD and adding the Moved-In metric assigned to the WD (step 886). In this manner, the Number_of_Queries counter is adjusted to accurately reflect the number of queries of the WD that have arrived for processing. An evaluation may then be made to determine if the Number_of_Queries that have arrived during exceeds the Throughput-SLG of the currently evaluated WD (step 888). If not, thereby indicating that the cause of the missed Throughput-SLG is under-demand, then the missed Throughput-SLG may be ignored (step 890), e.g., the action(s) associated with the Throughput-SLG to be performed in the event of Throughput-SLG non-compliance may be ignored. In other words, there is insufficient demand from the application servers to realize the Throughput-SLG. The service level goal evaluation routine cycle may then end (step 894).

Returning again to step 888, in the event the Number_of_Queries counter is greater than the Throughput-SLG for the WD thereby indicating that the missed Throughput-SLG is a legitimate system performance condition event, any actions associated with non-compliance of the Throughput-SLG may then be invoked (step 892). The service level goal evaluation routine cycle may then end according to step 894.

The action taken in response to the detection of a particular condition will vary depending on the type of event or condition detected. The automated action will fall into one of four broad categories (as shown in FIG. 8A):

1. Notify (block 825);
2. Change the Workload Management Ruleset's Working Values (block 830);
3. Initiate an automated response (block 835); and
4. Log the event or condition, if event or condition are not recognized (block 840).

Turning to the first possible automated action, the system may notify either a person or another software application/ component including, users, the Database Administrator, or a reporting application. Notification can be through one or more notification approaches:

Notification through an ASM event queue monitored by some other application (for example, "tell users to expect slow response times");

Notification through sending an Alert; and/or

Notification (including diagnostic drill-down) through automated execution of a program or a stored procedure.

Notification may be preferable where the system has no immediate way in which to ameliorate or rectify the condition, or where a user's expectation needs to be managed.

A second automated action type is to change the Workload Management Ruleset's working values.

Figure 9:
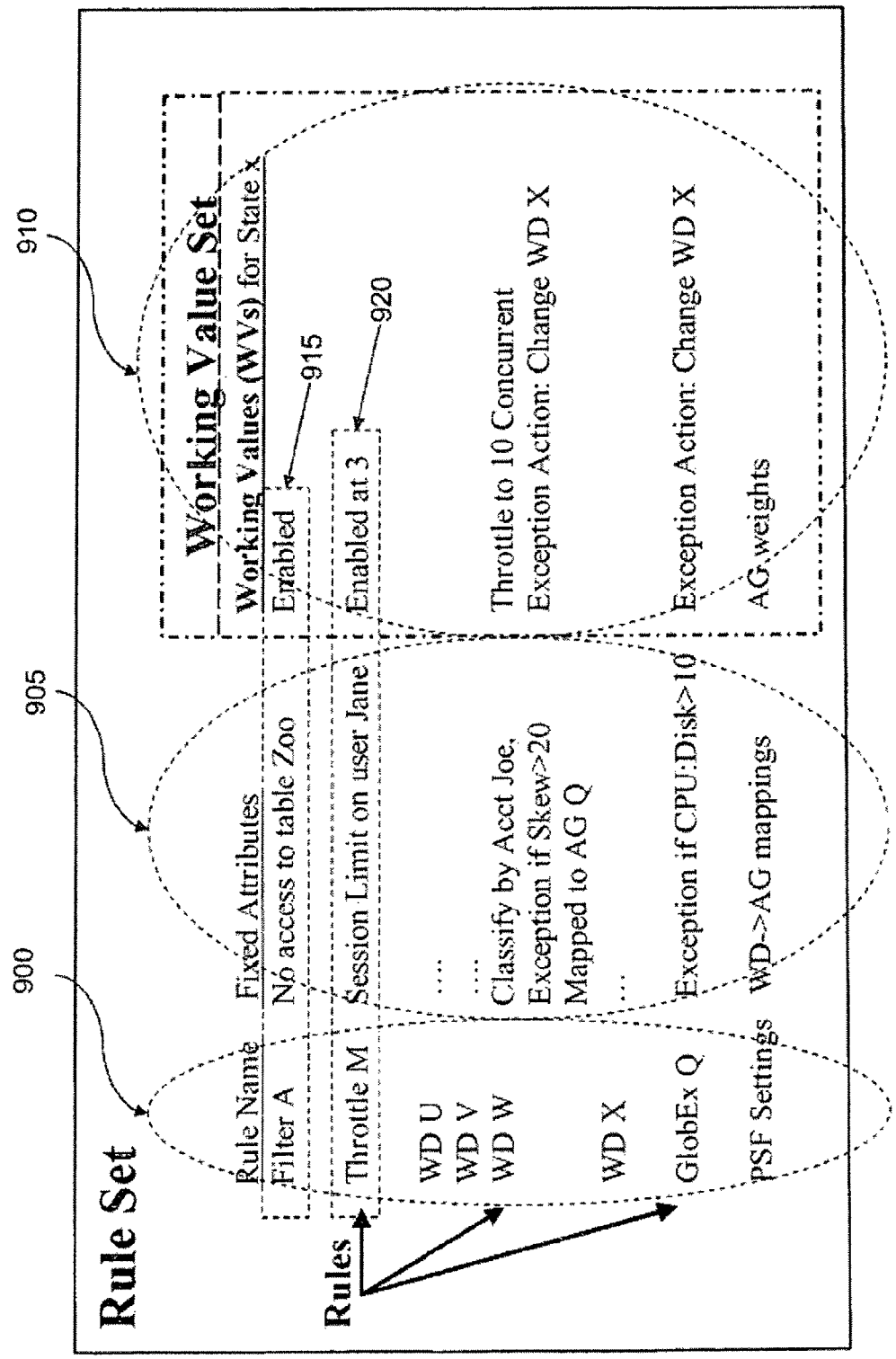
FIG. 9 is a table depicting an example rule set and working value set.

As shown in FIG. 9, the DBS has a number of rules (in aggregation termed a ruleset) which define the way in which the DBS operates. The rules include a name (block 900), an attribute (block 905), which describes the rules (e.g., session limit on a particular user) and a working value set (block 910) which is a flag or value which indicates whether the rule is active or not, and the particular setting of the value.

A number of 'states' can be defined, each state being associated with a particular working value set (e.g., a particular instance of a rule set). By swapping states, the Workload Management Ruleset's working values are changed.

This process is best illustrated by a simple example. In FIG. 9, there is shown a particular Working Value Set which, in the example, is associated with the state 'X'. State X, in the example, is a state that is invoked when the database is at almost peak capacity. Peak capacity, in the present example, is determined by detecting one of two events, namely that the arrival rate of jobs is greater than 50 per minute, or alternatively, that there is a sustained CPU usage of over 95% for 600 seconds. State X is designed to prevent resources being channeled to less urgent work. In state X, Filter A (block 915), which denies access to table 'Zoo' (which contains cold data and is therefore not required for urgent work), is enabled. Furthermore, Throttle M (block 920), which limits the number of sessions to user 'Jane' (a user who works in the marketing department, and therefore does not normally have urgent requests), is also enabled. State 'X' is therefore skewed towards limiting the interaction that user Jane has with the DBS, and is also skewed towards limiting access to table Zoo, so that the DBS can allocate resources to urgent tasks in preference to non-urgent tasks.

A second state 'Y' (not shown) may also be created. In State 'Y', the corresponding rule set disables filter 'A', and increases Jane's session limit to 6 concurrent sessions. Therefore, State 'Y' may only be invoked when resource usage falls below a predetermined level.

Each state is predetermined (e.g., defined beforehand by a DBA. Therefore, each ruleset, working value set, and state requires some input from a user or administrator that has some knowledge of the usage patterns of the DBS, knowledge of the data contained in the database, and perhaps even knowledge of the users.

A third action type is to resolve the issue internally. Resolution by the DBS is in some cases a better approach to resolving issues, as it does not require any input from a DBA or a user to define rules-based actions.

Resolution is achieved by implementing a set of internal rules which are activated on the basis of the event detected and the Enforcement Priority of the request along with other information gathered through the exception monitoring process.

Some examples of automated actions which result in the automatic resolution of issues are given below. This list is not exhaustive and is merely illustrative of some types of resolution.

For the purposes of this example, it is assumed that the event that is detected is a longer than average response time (e.g., an exception monitor detects that the response time SLG is continually exceed for a given time and percentage). The first step in launching an automated action is to determine whether an underlying cause can be identified.

For example, is the AWT pool the cause of the longer than average response time? This is determined by evaluating how many AWTs are being used. If the number of idle or AWTs is very low, the AWT pool is automatically increased to the maximum allowed (e.g., eighty).

The SLG is then monitored to determine whether the issue has been ameliorated. When the SLG is satisfactory for a qualifying time, the AWT poolsize is progressively decreased until a suitable workable value is found.

However, the AWT pool may not be the cause of the event. Through the measuring of various system performance indicators, it may be found that the Arrival Rate is the cause of decreased performance. Therefore, rather than limiting on concurrency, the DBS can use this information to take the action of limiting the arrival rate (e.g., throttle back the arrival rate to a defined level, rather than allowing queries to arrive at unlimited rates). This provides an added ability to control the volume of work accepted per WD.

Alternatively, there may be some WDs at same or lower enforcement exceeding their anticipated arrival rates by some qualifying time and amount. This is determined by reviewing the anticipated arrival rate as defined by the SLG.

If there are WDs at the same or lower enforcement exceeding their anticipated arrival rates, the WD's concurrency level is decreased to a minimum lower limit.

The SLG is then monitored, and when the SLG returns to a satisfactory level for a qualifying time, the concurrency level is increased to a defined normal level (or eliminated if no concurrency level was defined originally).

If the event cannot be easily identified or categorized by the DBS, then the event is simply logged as an 'un-resolvable' problem. This provides information which can be studied at a later date by a user and/or DBA, with a view to identifying new and systemic problems previously unknown.

As described, disclosed embodiments provide mechanisms for tracking the number of queries received for processing for a workload to facilitate arrival rate qualifications to throughput service level goals. A number of queries counter associated with a particular workload is incremented each time a query assigned to the particular workload is received thereby tracking the arrival rate of workload queries. To facilitate arrival rate qualifications to throughput service level goals, a moved-in and moved-out metric or parameter may be associated with respective workloads. In the event that a query is moved from one workload to another workload after the query has be accounted for in the number of queries counter associated with the workload, a moved-out metric associated with the workload may be incremented to indicate that a query has been removed from the workload. In this manner, the number of queries counter associated with the workload to which the query was originally assigned may be adjusted accordingly. In a similar manner, a moved-in metric associated with the workload may be incremented when a query that has previously been received and assigned to another workload is moved into the workload. The number of queries counter may be adjusted to properly reflect the received number or queries allocated to a workload by subtracting the moved-out metric of the workload and adding the moved-in metric of the workload. When a system performance condition comprising a non-compliant system performance level with respect to a Throughput Service Level Goal is identified, the arrival rate, as specified by the number of queries counter, may be compared with the Throughput Service Level Goal. If the arrival rate of queries for the workload is greater than the Throughput Service Level Goal of the workload, then the cause of the missed Service Level Goal is system over-load, and actions associated with non-compliance of the Throughput Service Level Goal may then be performed. However, if the query arrival rate as specified by the number of queries counter of the workload is less than or equal to the Throughput Service Level Goal of the workload, then the cause of the missed Throughput Service Level Goal is under-demand, and the preliminary identification of the missed Service Level Goal as a system performance condition event is dismissed or otherwise ignored. That is, the missed Service Level Goal is not treated as a system performance condition event, and the action(s) associated with non-compliance of the Throughput Service Level Goal are not performed.

The flowcharts of FIGS. 8A-8C depict process serialization to facilitate an understanding of disclosed embodiments and are not necessarily indicative of the serialization of the operations being performed. In various embodiments, the processing steps described in FIGS. 8A-8C may be performed in varying order, and one or more depicted steps may be performed in parallel with other steps. Additionally, execution of some processing steps of FIGS. 8A-8C may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

We claim:

1. A method of evaluating service level goals in a database system, the method comprising:
   reading a throughput service level goal assigned to a workload comprising a plurality of queries, wherein the throughput service level goal specifies a target number of queries of the workload to be processed per a predefined unit of time;
   reading a number of queries that have arrived for the workload during the unit of time;
   determining whether the number of queries that have arrived exceeds the target number of queries specified by the throughput service level goal;
   performing one or more actions associated with the throughput service level goal when the throughput service level goal is missed and the number of queries that have arrived exceeds the target number of queries specified by the throughput service level goal, and
   not performing the one or more actions associated with the throughput service level goal when the throughput service level goal is missed and the number of queries that have arrived does not exceed the target number of queries specified by the throughput service level goal.

2. The method of claim 1, further comprising:
   transferring a query from the workload to a second workload;
   incrementing a first metric that tracks the number of queries transferred from the workload; and
   incrementing a second metric that tracks the number of queries transferred to the second workload.

3. The method of claim 2, further comprising subtracting the first metric from the number of queries that have arrived for the workload.

4. The method of claim 1, further comprising:
   transferring a query to the workload from a second workload;
   incrementing a first metric that tracks the number of queries transferred to the workload; and
   incrementing a second metric that tracks the number of queries transferred from the second workload.

5. The method of claim 4, further comprising adding the first metric to the number of queries that have arrived for the workload.

6. A program storage medium readable by a computer having a memory, the medium tangibly embodying one or more programs of instructions executable by the computer to perform method steps for evaluating service level goals in a database system, the method comprising the steps of:

readies a throughput service level goal assigned to a workload comprising a plurality of queries, wherein the throughput service level goal specifies a target number of queries of the workload to be processed per a predefined unit of time;

reading a number of queries that have arrived for the workload during the unit of time;

determining whether the number of queries that have arrived exceeds the target number of queries specified by the throughput service level goal; and performing one or more actions associated with the throughput service level goal when the throughput service level goal is missed and the number of queries that have arrived exceeds the target number of queries specified by the throughput service level goal, and not perform the one or more actions associated with the throughput service level goal when the throughput service level goal is missed and the number of queries that have arrived does not exceed the target number of queries specified by the throughput service level goal.

7. The program storage medium of claim 6, wherein the method further comprises the steps of:

transferring a query from the workload to a second workload;

increments a first metric that tracks the number of queries transferred from the workload; and increments a second metric that tracks the number of queries transferred to the second workload.

8. The program storage medium of claim 7, wherein the method further comprises the step of:

subtracting the first metric from the number of queries that have arrived for the workload.

9. The program storage medium of claim 6, wherein the method further comprises the steps of:

transferring a query to the workload from a second workload;

incrementing a first metric that tracks the number of queries transferred to the workload; and increments a second metric that tracks the number of queries transferred from the second workload.

10. The program storage medium of claim 9, wherein the method further comprises the step of:

adding the first metric to the number of queries that have arrived for the workload.

11. A database system for evaluating service level goals in the database system, the database system comprising:

at least one storage facility on which a database table is stored; and a plurality of processing modules each allocated a respective subset of rows of the table, wherein a processing module of the plurality of processing modules (i) reads a throughput service level goal assigned to a workload comprising a plurality of queries, wherein the throughput service level goal specifies a target number of queries of the workload to be processed per a predefined unit of time, (ii) reads a number of queries that have arrived for the workload during the unit of time, (iii) determines whether the number of queries that have arrived exceeds the target number of queries specified by the throughput service level goal, and (iv) performs one or more actions associated with the throughput service level goal when the throughput service level goal is missed and the number of queries that have arrived exceeds the target number of queries specified by the throughput service level goal, and does not perform the one or more actions associated with the throughput service level goal when the throughput service level goal is missed and the number of queries that have arrived does not exceed the target number of queries specified by the throughput service level goal.

12. The system of claim 11, wherein the processing module evaluates a first metric that specifies a number of queries that have been transferred from the workload and a second metric that specifies a number of queries that have been transferred to the workload, and wherein the processing module subtracts the first metric from the number of queries that have arrived and adds the second metric to the number of queries that have arrived.

* * * * *